United States Patent Office 3,026,284
Patented Mar. 20, 1962

3,026,284
PROCESS OF TREATING A THERMOPLASTIC AMINE-ALDEHYDE RESIN WITH A THERMO-SETTING ADDITIVE AND PRODUCT OBTAINED THEREFROM
James H. Freeman, Franklin Township, Westmoreland County, Sydney Robbins, Monroeville, and Robert F. Sterling, Churchill Borough, Allegheny County, Pa., assignors to Westinghouse Electric Corporation, East Pittsburgh, Pa., a corporation of Pennsylvania
No Drawing. Filed May 13, 1959, Ser. No. 812,816
6 Claims. (Cl. 260—45.1)

The present invention relates to thermosetting agents for nitrogenous resins and has particular reference to resinous molding compounds and a process for converting certain specified thermoplastic nitrogenous resins to cured thermoset bodies. This application is a continuation-in-part of our copending application Serial No. 533,918, filed September 12, 1955, now abandoned, and assigned to the same assignee as the present invention.

Thermoset nitrogenous resins and articles made therefrom have exceptionally high flame resistance, good electrical properties, and excellent resistance to high power electric arcs. Heretofore, various thermosetting additive materials have been employed to convert thermoplastic nitrogenous resins to a thermoset state. Hexamethylene tetramine, for example, has been used both alone and in conjunction with phenolic resins as additives. When such prior additive materials are used it is difficult to mold the resin into an article of desired size and shape in a molding cycle rapid enough to permit economical commercial operation, and at the same time retain a high proportion of the nitrogenous component in the finished article. It has been necessary to cool the mold prior to ejection of the molded piece, thereby increasing the over-all period of time required for the manufacture of the molded article.

Other attempts to mold thermoset nitrogeneous resins of the type described hereinabove have not been particularly successful. Thus, it has been attempted to first copolymerize such resins with phenol or methylolphenol mixtures in the presence of either acidic or basic catalysts and then to thermoset the mixture by the addition of hexamethylene tetramine or other methylene engendering agents. The generally unsatisfactory results obtained when operating according to this latter prior art process presumably are due to the more favored self reaction between the methylolphenols instead of the desired reaction between the methylol groups on the methylolphenols and the >NH group on the nitrogenous compound portion of the resin.

The object of the present invention is to provide a method for treating certain thermoplastic nitrogenous resins with certain selected polymethylolphenols whereby the resins are rapidly converted to thermoset solids having considerable hot strength or rigidity, whereby they may be ejected satisfactorily from the mold while still hot.

Another object of this invention is to provide solid, thermoset nitrogenous resins having high hot strengths and low post molding shrinkage while retaining the desirable characteristics of the nitrogenous resin by treating certain thermoplastic nitrogenous resins with certain polymethylolphenol thermosetting additives.

Other and further objects of the invention will, in part, be obvious and will, in part, appear hereinafter.

In accordance with the present invention and in the attainment of the foregoing objects there is provided a process which comprises admixing (A) thermoplastic nitrogenous resins with (B) at least one polymethylolphenol or selected salts thereof in which all hydrogen atoms in positions ortho and para to the phenolic hydroxyl group on the parent phenolic compound have been replaced by methylol groups, and heating the resulting mixture whereby the components react to form a thermoset body.

More specifically, the invention provides a process which comprises, in combination, the steps of admixing and reacting with each one mol of a nitrogenous compound from 0.5 to 0.95 mol of an aldehyde to form a thermoplastic resinous compound, admixing the thermoplastic resin with at least one polymethylolphenol or certain salts thereof in an amount such that the total number of methylene groups present in the final mixture shall be at least equal to one-half of the total combined equivalents of NH or $NH_2$ groups plus the reactive, i.e., methylolated, ortho and para positions in the phenol compounds present, said polymethylolphenol having substituted methylol groups for all hydrogen atoms in positions ortho and para to the phenolic hydoxyl group on the parent phenolic compound, and heating the resulting mixture whereby the components react and said thermoplastic resin is converted to a thermoset body.

The addition of a polymethylolphenol thermosetting additive as above described to a thermoplastic nitrogenous resin permits the resin to thermoset very rapidly in the mold at common molding temperatures and to exhibit considerable hot strength or rigidity in the mold. It is possible, therefore, to eject the molded articles from the mold without the necessity of cooling the mold prior to ejection of the piece.

It is also possible when operating in accordance with the present invention to produce molded articles having the desirable properties attributable to the presence of a large proportion of nitrogen in the resin and at the same time achieve a rapid and commercially economical molding cycle. The molded articles prepared in accordance with this invention have exceptional resistance to high power electric arcs, high flame resistance, good electrical properties and exhibit low post molding shrinkage.

The thermoplastic nitrogeneous resins which are suitable for treatment in accordance with this invention include those resins prepared by reacting one mol of a nitrogenous compound selected from the group consisting of urea, dicyandiamide, nitrodicyanidamide, methyloldicyandiamide, biuret, guanidine and melamine with from 0.5 to 0.95 mol of an aldehyde.

Polymeric compounds having at least one reactive >NH group per molecule, for example, polyamides, may be substituted in whole or in part for the nitrogenous resins described herein.

The aldehydes which may be reacted with the nitrogenous compounds in accordance with this invention include formaldehyde (generally in a water solution as formalin), paraformaldehyde, furfuraledhyde, acetaldehyde benzaldehyde, and the like. These materials may be used singly or in any admixture of two or more.

The thermosetting additive employed in accordance with this invention comprises a selected polymethylolphenol. More specifically, it comprises a thermosetting additive selected from the group consisting of polymethylolphenols, and the alkali metal, alkaline earth metal, and quaternary amine salts thereof. The polymethylolphenol has all hydrogen atoms in positions ortho and para to the phenolic hydroxyl group on the parent phenolic compound replaced by methylol groups. Examples of suitable polymethylolphenols include 2,4,6-trimethylolphenol and the sodium and lithium salts thereof, trimethylbenzylammonium-2,4,6-trimethylolphenol,
2,4,6-trimethylol-meta-cresol, and the barium salt thereof,
3,5,3',5'-tetramethylol-4,4'-dihydroxydiphenylmethane,
3,5,3',5'-tetramethylol-2,2'-dihydroxydiphenylmethane, 3,5,3',5'-tetramethylol-2,4'-dihydroxydiphenylmethane,
3,5,3',5'-tetramethylol-4,4'-dihydroxydiphenyldimethyl-
methane, and
3,5,3',5'-tetramethylol-4,4'-dihydroxydiphenylsulfone.

Dimethylol compounds such as 2,6-dimethylol p-cresol may also be used if the nitrogenous resin contains two or more reactive >NH groups.

One of the thermosetting additives which is suitable for use, namely, 2,4,6-trimethylolphenol or its alkali metal, alkaline earth metal, or quaternary amine salts, may be prepared conveniently by effecting reaction in solution between about 3 mols of formaldehyde and 1 mol of phenol in the presence of one mol of alkali. The reaction is carried out at a temperature of from 15° C. to about 70° C. for a period of several hours to several days depending on the temperature. Alkali salts of the polymethylolphenols then may be precipitated and recovered by diluting the reaction mixture in a suitable water miscible organic solvent and then separated therefrom by filtration, decantation or by other suitable means.

The additives which comprise the tetramethylol derivatives set forth hereinabove may be prepared by a similar reaction using four mols of formaldehyde with one mol of the appropriate dihydroxydiphenylmethane in alkaline solution. A particularly useful mixture of additives, viz., 2,4,6-trimethylolphenol and 3,5,3',5'-tetramethylol-4,4'-dihydroxydiphenylmethane may also be obtained by heating, for example, at 70° C. to 80° C. the solution containing the alkaline salt of trimethylolphenol.

Many solvents are suitable for use in effecting the precipitation and recovery of the alkali salts of the polymethylolphenols just described. In general, monohydric alcohols or ketones with up to four carbon atoms are efficient precipitating agents, acetone, ethanol and isopropanol being particularly suitable.

The following is a specific example of a method of preparing one of the thermosetting additives, viz., 2,4,6-trimethylolphenol, which may be used in converting a thermoplastic nitrogenous resin to a thermoset body in accordance with the method of the present invention.

*Example I*

A solution was prepared by suspending 42 parts by weight (1 mol) of lithium hydroxide monohydrate in 40 parts by weight of water and adding the same to 94 parts by weight (1 mol) of phenol. The solution was cooled to room temperature and 244 parts by weight (3 mols) of formalin (37% by weight formaldehyde) were added with stirring. The mixture was kept at room temperature for several days, and then poured into several times its volume of isopropanol. After fifteen minutes the resultant precipitate was filtered, washed successively with alcohol and acetone, and dried under vacuum. The product is the lithium salt of 2,4,6-trimethylolphenol and is obtained as a granular white powder.

The lithium salt is of particular advantage when the salt is to be isolated because of its rapid formation, ease of isolation, high purity, and considerably greater stability in storage. Other alkalis may be used however, and for certain applications isolation of the salt of the polymethylolphenol is not required, generation of the substance within the resinous mixture sufficing to achieve the desired result.

The polymethylolphenol material may be employed in an amount within the range of from 5 to 95 percent by weight based on the total weight of nitrogenous resin plus polymethylolphenol material. The optimum amount for any given nitrogenous resin will, of course, depend upon the nature of the particular resin being treated. To prepare a resin having good arc resistance about 15 to 40 parts by weight of a polymethylolphenol should be used, for example, with each 85 to 60 parts of a dicyandiamide resin. On the other hand, if high arc resistance is not a prime consideration larger amounts of polymethylolphenol may be used. The larger the amount of polymethylolphenol used, the faster the rate of thermosetting.

The order in which the various components are brought into contact with one another is not important. Thus, the nitrogenous compound and aldehyde may be introduced into a reaction vessel and reacted to form a thermoplastic resin. The resin after having been converted to a particulate form may then be admixed thoroughly with the powdered thermosetting additive on a roll mill. The molding powder thus obtained may then be introduced into a mold of suitable size and shape wherein suitable pressures are exerted thereon at usual molding temperatures to form the finished article.

In a variation of this procedure a phenol and sufficient formaldehyde, to react with all available ortho and para hydrogen atoms, may be reacted to the polymethylolphenol stage in the presence of alkali, the alkali then neutralized and a nitrogenous compound and additional aldehyde added and allowed to condense to a resin which is then dehydrated, ground and mixed with various fillers to form a particulate molding powder.

In accordance with still another procedure the nitrogenous compound and the aldehyde may be reacted to form a thermoplastic resin in the presence of a selected proportion of a phenol. The thermoplastic resin thus obtained, after having been reduced to a particulate form, then may be admixed with a powdered thermosetting additive of this invention and converted to a thermoset resin in accordance with the procedure described in the preceding paragraph.

In accordance with still another procedure, a nitrogenous compound, for example, dicyandiamide may be reacted with an aldehyde to form a derived nitrogenous compound, namely, monomethyloldicyandiamide. This material, which is a powder after isolation from the reaction medium, then may be admixed with a powdered thermosetting additive and processed as indicated hereinabove to form a thermosetting resin.

Molded members are prepared in accordance with this invention by grinding the thermoplastic resin into a powder and then admixing said powder with the thermosetting additive which also is in particulate form. The particulate materials so prepared preferably are admixed with suitable powdered lubricants, such as zinc stearate, calcium stearate; fillers, such as cotton floc, asbestos fibers, silicates, and wood flour; pigments and dyes. The particulate materials then may be blended thoroughly on a roll mill or the like after which weighed portions may be placed in a hot press and molded into members of desired shape and size at predetermined temperatures and pressures until the resin reacts and thermosets.

Alternatively, the resin and thermosetting additive may be dissolved in a solvent and impregnated into sheets of a filler material such as cotton, asbestos, glass cloth, or paper. The impregnated sheets then may be compressed under heat and pressure to form thermoset laminated products. Plates, tubes, baffles and other insulating members may be produced by such procedures. Circuit breaker housings, meter bases, coil supports, contact supports and other apparatus may be molded from the compositions of this invention.

In order to indicate even more fully the advantages of the present invention, the following specific examples are set forth. Unless otherwise indicated, the parts set forth throughout the specification and the appended claims are by weight.

*Example II*

(a) A thermoplastic resin was prepared by heating 840 parts (10 mols) of dicyandiamide and 650 parts (8 mols) of formalin (37% aqueous formaldehyde) together with 95 parts of benzene. The mixture was refluxed at a temperature of 70° C. After 30 minutes of refluxing the benzene was removed by distillation and the residue was refluxed for an additional two and a half hours at 100°

C. The mixture was then dehydrated under a 26 inch vacuum at a temperature of 100° C. The liquid mixture then was permitted to cool to room temperature whereupon it hardened to a solid, clear, colorless, thermoplastic resin.

(b) Thirty-five parts of the thermoplastic resin, in particulate form, were admixed and milled on heated differential rolls with about 15 parts of lithium trimethylolphenate, 1.5 parts calcium stearate, 24 parts of aluminum silicate pigment, and 24.5 parts cotton floc. This molding powder was introduced into a press mold having a disc-shaped cavity and four integral truncated cone-shaped cavities of varying draft and placed under a pressure of 5000 p.s.i. for five minutes at a temperature of 160° C. Immediately thereafter the molded article was ejected hot from the press with no sticking or deflection or deformation thereof occurring in the mold. The molded article was a thermoset solid.

*Example III*

Example II(b) was repeated with the exception that hexamethylene tetramine, a methylene engendering agent, was employed in place of the lithium trimethylolphenate. It was not possible to thermoset the resin even when large amounts of hexamethylene tetramine were used as the thermosetting agent and long periods of time were used. In fact, the composition softened with the addition of more and more hexamethylenetetramine.

*Example IV*

A molding powder was prepared from 25 parts of the powdered thermoplastic resin prepared as described in Example II(a), 10 parts of lithium trimethylolphenate, 1.5 parts calcium stearate, 31.5 parts of aluminum silicate pigment and 32 parts of cotton floc. After three minutes in the press this material yielded an article which could be ejected while hot without sticking or deflecting from the mold. The article was a thermoset solid.

*Example V*

A molding powder was prepared by admixing 20 parts of monomethyloldicyandiamide with 15 parts of lithium trimethylolphenate, 1.5 parts of calcium stearate, 31.5 parts of aluminum silicate pigment and 32 parts of cotton floc. After only two minutes in a press maintained at a pressure of 5000 p.s.i. at a temperature of 150° C., this molding powder yielded a thermoset article having a glossy surface which could be ejected from the mold while hot without deflection or sticking thereto.

Thermoplastic nitrogenous resins suitable for use in practicing the invention may be prepared by reacting up to one mole of a phenol for each mole of the nitrogenous compound. From 0.5 to 0.95 mole of aldehyde is reacted with each mole of the combined phenol and nitrogenous compound. The resulting resins are thermoplastic. Examples of phenolic materials which are suitable for use in accordance with this invention include phenol, and ortho-, meta-, and para-cresol or isopropyl phenols. Xylenol and other alkyl substituted phenols also may be present in small amounts. These phenolic materials may be employed singly or in any admixture of two or more.

The following examples illustrate the preparation of a phenol-containing thermoset resin prepared in accordance with the principles of this invention.

*Example VII*

A thermoplastic nitrogenous resin was prepared by heating 672 parts (8 mols) of dicyandiamide and 652 parts (8 mols) of formalin (37% formaldehyde) to a temperature of 75° C. and then adding 220 parts (2 mols) of an 85% phenol (hydroxybenzene) solution thereto. The mixture was refluxed for three hours at 100° C. and thereafter was dehydrated under 26 inches of vacuum at a temperature of 100° C. The resulting liquid solution was permitted to cool to room temperature whereupon it transformed to a clear, hard, yellow thermoplastic resin. About 35 parts by weight of the resin then were ground into a fine powder and were thoroughly admixed and milled on heated differential rolls with about 7 parts of lithium trimethylolphenate, 1.5 parts of calcium stearate, 28 parts of aluminum silicate pigment, and 28.5 parts of cotton floc. The molding powder thus prepared then was introduced into a die having a disc-shaped cavity connected to four integral truncated cone-shaped cavities of varying draft. A quantity of the powder was molded in the die at a temperature of 160° C. under a pressure of 5,000 p.s.i. for a period of 8 minutes. Immediately thereafter the molded piece was ejected hot from the press and was found to have a smooth surface and to be ejected without any sticking, cracking or deflection in the mold. The molded piece was a thermoset solid.

*Example VIII*

The following ingredients were thoroughly admixed and milled:

| | Parts |
|---|---|
| Monomethylol dicyandiamide | 28 |
| Lithium trimethylolphenate | 9 |
| Zinc stearate | 2 |
| Aluminum silicate pigment | 30 |
| Cotton floc | 30 |
| Dye | 1 |

This mixture was molded into discs ⅛ inch thick and 4 inches in diameter in a press in one minute under a pressure of 5000 p.s.i. at a temperature of 155° C. The molded discs were ejected hot from the press with no sticking or deflection occurring in the mold. The discs had a "D" Shore Durometer hardness of 80 at 150° C. The arc resistance of the discs was tested by placing two vertical ½ inch diameter graphite electrodes ½ inch apart on the surface of the discs, the electrodes being connected to each other by No. 24 copper wire. A 6-cycle current of 500 volts at 500 amperes was applied to the electrodes and through the copper wire causing the wire to vaporize in the arc generated thereby breaking the current flow. The voltage was maintained on the graphite electrodes. Current did not flow between the electrodes thus demonstrating that the surface of the molded disc was non-conducting. The copper wire was replaced, the arc repeated and the voltage reapplied for a total of 50 different times with a 30 second delay between each application. After the fiftieth application current still had not passed on reapplication of voltage after vaporization of the wire indicating the high power arc resistance of the discs. In our experience it is unusual for any predominately organic composition, similar to this one, to withstand more than two or three repeat arcs without failure in this test.

*Example IX*

Example VIII was repeated using sodium trimethylolphenate in place of the lithium trimethylolphenate. Results identical to those obtained in Example VIII were obtained when the discs of this example were subjected to the arc resistance tests.

*Example X*

Example VIII was repeated with the exception that the lithium trimethylolphenate was replaced by trimethylolphenol isolated from an acetone solution after neutralization of the lithium salt with acetic acid. Discs ⅛ inch thick and 4 inches in diameter were obtained after molding for five minutes under a pressure of 5000 p.s.i. at 155° C. Results identical to those obtained in Examples VIII and IX were obtained when the discs of this example were subjected to the arc resistance tests.

Example XI

The following ingredients were thoroughly admixed and milled.

| | Parts |
|---|---|
| Monomethyloldicyandiamide | 30 |
| Lithium salt of 2, 4, 6-trimethylolphenol (50 mol percent) | |
| Lithium salt of 3,5,3′,5′-tetramethylol-4,4′-dihydroxydiphenyl-methane (50 mol percent) | 10 |
| Zinc stearate | 2 |
| Dye | 1 |
| Aluminum silicate pigment | 22 |
| Cotton floc | 31 |
| Wood flour | 4 |

This mixture was molded into discs in one minute as described in Example VIII. These discs had a "D" Shore Durometer hardness of 85 at 150° C. and withstood the 50 repeated arcs and reapplications of voltage at 30 second intervals, as described in Example VIII, without conducting current, thereby demonstrating their high power arc resistance.

Example XII

A mixture of 94 parts of phenol, 40 parts of sodium hydroxide and 242 parts of formalin (37% formaldehyde) were thoroughly admixed with about 40 parts of water and then allowed to stand for 24 hours at 50° C. Sulfuric acid was then added in a quantity sufficient to reduce the pH of the mixture to about 4–5. To the resultant trimethylolphenol, there was added 610 parts of dicyandiamide and 590 parts of formalin (37% formaldehyde). This mixture was heated and then vacuum dehydrated at an absolute pressure of from 20 to 50 millimeters of mercury to remove substantially all the water. On cooling, the mixture solidified. The solid was ground to a powder after which 35 parts thereof were admixed and milled with:

| | Parts |
|---|---|
| Calcium stearate | 1.5 |
| Aluminum silicate pigment | 31.5 |
| Cotton floc | 32 |

This mixture was molded into discs as described in Example VIII but using a four-minute cycle in the mold. These discs had a "D" Shore Durometer hardness of 80 at 150° C. and withstood the 50 repeated arcs and reapplications of voltage at 30 second intervals, as described in Example VIII, without conducting current thereby demonstrating their high power arc resistance.

Example XIII

A mixture of 84 parts of dicyandiamide and 77 parts of formalin (37% formaldehyde) was refluxed for one hour in the absence of a catalyst. After dehydration the mixture was allowed to cool and harden. A mixture of four parts of the resin thus prepared and 1.5 parts of an equal part by weight mixture of lithium salts of trimethylolphenol - 4,4′ - tetramethylol and 3,5,3′,5′ - tetramethyl - 4,4′ - dihydroxydiphenylmethane was dissolved in 5 parts of water and 5 parts of pyridine. Sheets of alpha cellulose paper were impregnated with the solution to a resin ratio of 1.6. The term resin ratio refers to the weight of the paper plus the weight of the resin impregnated therein to the weight of the paper alone. The impregnated sheets were dried in a forced draft oven for 5–10 minutes at 125° C. and then 48 sheets were superimposed upon one another and pressed for 30 minutes under a pressure of 300 p.s.i. at 150° C. into a board 6″x6″x3/8″. The board had a good appearance and all the sheets were well laminated or bonded together.

While the present invention has been described with particular reference to the thermosetting of essentially thermoplastic nitrogenous resins, it will be understood that it is applicable also to the thermosetting of resins prepared by reacting one mol of a nitrogenous compound having at least two reactive >NH groups per molecule with more than one mol of aldehyde. The addition of the thermosetting polymethylolphenols herein described to resins of this latter type results in an enhanced speed of thermosetting reaction, improved hot strength, and a reduced molding time.

While the present invention has been described with reference to preferred embodiments thereof, it will be understood of course that certain changes, substitutions and modifications may be made therein without departing from its true scope.

We claim as our invention:

1. A process for converting a thermoplastic resin, derived by reacting one mol of a nitrogenous compound selected from the group consisting of urea, dicyandiamide, nitrodicyandiamide, methyloldicyandiamide, biuret, guanidine, and melamine with from 0.5 to 0.95 mol of an aldehyde, to a thermoset body consisting of, admixing said thermoplastic resin with at least one thermosetting additive selected from the group consisting of polymethylolphenols and alkali metal, alkaline earth metal, and quaternary amine salts thereof, said thermosetting additive being employed in an amount within the range of from 5 to 95 percent by weight based on the total weight of said thermoplastic resin plus said thermosetting additive and said additive having all hydrogen atoms in positions ortho and para to the phenolic hydroxyl group on the parent phenolic compound replaced by methylol groups, and heating the resulting mixture at a temperature within the range of about 125° C. to 185° C. whereby the components react and said thermoplastic resin is converted to the thermoset body having high electrical arc resistance.

2. A process as set forth in claim 1 wherein the thermoplastic resin and said thermosetting additive are in particulate form.

3. A process for converting a solid, particulate thermoplastic resin, derived by reacting one mol of a nitrogenous compound selected from the group consisting of urea, dicyandiamide, nitrodicyandiamide, methylolodicyandiamide, biuret, guanidine and melamine with from 0.5 to 0.95 mol of an aldehyde, to a thermoset body which consists of, forming a molding powder by admixing said solid thermoplastic resin with at least one thermosetting additive selected from the group consisting of polymethylolphenols and alkali metal, alkaline earth metal, and quaternary amine salts thereof, said thermosetting additive employed in an amount within the range of from 5 to 95 percent by weight based on the total weight of said thermoplastic resin plus said thermosetting additive and said additive having all hydrogen atoms in positions ortho and para to the phenolic hydroxyl group on the parent phenolic compound replaced by methylol groups, and heating said molding powder to a temperature of 125° C. to 185° C. to convert said molding powder to a thermoset resinous product having high electrical arc resistance.

4. A process as set forth in claim 3 in which said thermosetting additive is 2,4,6-trimethylolphenol.

5. The process which comprises reacting one mol of dicyandiamide with from 0.5 to 0.95 mol of an aldehyde to form monomethyloldicyandiamide, admixing said monomethyloldicyandiamide with at least one thermosetting additive selected from the group consisting of polymethylolphenols and alkali metal, alkaline earth metal, and quaternary amine salts thereof, said thermosetting additive being employed in an amount within the range of from 5 to 95 percent by weight based on the total weight of said monomethyloldicyandiamide plus said thermosetting additive and said additive having all hydrogen atoms in positions ortho and para to the phenolic hydroxyl group on the parent phenolic compound replaced by methylol groups, and heating the resulting mixture at a temperature within the range of about 125° C.

to 185° C., whereby the components react and said monomethyloldicyandiamide is converted to a thermoset body having high electrical arc resistance.

6. A hard, thermoset product comprising the product derived by admixing powdered monomethyloldicyandiamide with at least one thermosetting additive selected from the group consisting of polymethylolphenols and alkali metal, alkaline earth metal, and quaternary amine salts thereof, said thermosetting additive being employed in an amount within the range of from 5 to 95 percent by weight based on the total weight of said monomethyloldicyandiamide plus said thermosetting additive and said additive having all hydrogen atoms in positions ortho and para to the phenolic hydroxyl group on the parent phenolic compound replaced by methylol groups, and heating the resulting mixture at a temperature within the range of about 125° C. to 185° C. whereby the monomethyloldicyandiamide is converted to a thermoset body having high electrical arc resistance.

References Cited in the file of this patent

UNITED STATES PATENTS 2,432,544    Rhodes               Dec. 16, 1947

FOREIGN PATENTS 654,351    Great Britain           June 13, 1951